United States Patent [19]

Henrich

[11] 4,033,272
[45] July 5, 1977

[54] ELECTRONIC IGNITION TIMING SYSTEM FOR AN INTERNAL COMBUSTION ENGINE

[75] Inventor: Robert Samuel Henrich, Farmington Hills, Mich.

[73] Assignee: The Bendix Corporation, Southfield, Mich.

[22] Filed: May 14, 1975

[21] Appl. No.: 577,490

[52] U.S. Cl. .......................................... 123/117 R
[51] Int. Cl.² .......................................... F02P 5/04
[58] Field of Search .... 123/117 R, 148 E, 146.5 B, 123/32 CA

[56] References Cited

UNITED STATES PATENTS

| | | | |
|---|---|---|---|
| 3,559,629 | 2/1971 | Sauvignet | 123/117 R |
| 3,816,717 | 6/1974 | Yoshida | 123/32 EA |
| 3,890,944 | 6/1975 | Werner | 123/117 R |
| 3,896,773 | 7/1975 | Edison | 123/32 EA |
| 3,918,417 | 11/1975 | Gambill | 123/32 EA |
| 3,923,022 | 12/1975 | Scholl | 123/117 R |
| 3,935,845 | 2/1976 | Aono | 123/117 R |
| 3,939,811 | 2/1976 | Sasayama | 123/117 R |

Primary Examiner—Ronald B. Cox
Attorney, Agent, or Firm—James R. Ignatowski

[57] ABSTRACT

An electronic ignition timing system for an internal combustion engine is disclosed. The system integrates for a first time interval a time dependent charge signal indicative of the ignition advance as a function of engine speed, then dissipates the integrated signal as a function of engine load to a predetermined value to generate an ignition timing signal which is a function of both engine speed and engine load. The time dependent charge signal varies from one value to another at predetermined time intervals to closely approximate the nonlinear ignition advance requirements of the engine as a function of engine speed.

30 Claims, 8 Drawing Figures

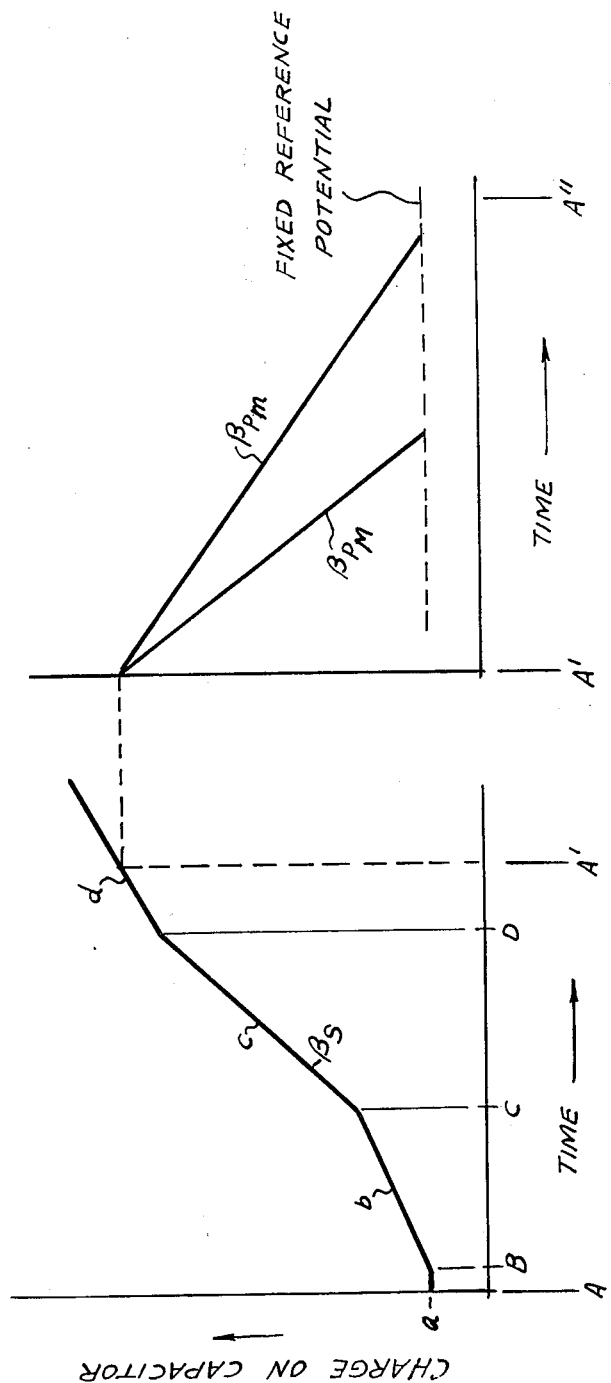

ELECTRONIC IGNITION TIMING SYSTEM FOR AN INTERNAL COMBUSTION ENGINE

BACKGROUND OF THE INVENTION

1. Field of the Invention

The present invention relates to ignition systems for internal combustion engine and, in particular, to an electronic ignition timing system for regulating ignition timing as a function of both engine speed and engine load.

2. Prior Art

The necessity for and advantages of regulating the ignition timing of an internal combustion engine are well known. A finite period of time is required for the complete combustion of the fuel/air mixture in each cylinder of the engine. Therefore, in order to realize full power from this combustion process under dynamic operating conditions, the fuel/air mixture should be ignited a predetermined time prior to the initiation of each piston's power stroke. The time that the fuel/air mixture should be ignited prior to the initiation of the power stroke is a function of the mixtures burn rate which is an inverse function of the quantity of the fuel/air mixture in each cylinder, turbulence and other factors. By defining the initiation of each piston's power stroke as the top dead center (TDC) position of the piston at the completion of the compression stroke, it is possible to determine when the fuel/air mixture should be ignited, with reference to the TDC position of the piston. In contemporary internal combustion engine systems, the ignition timing is mechanically controlled by means of a distributor timing shaft rotating in synchronism with the crankshaft of the engine. The control of the ignition timing is normally accomplished by a centrifugal advance and a vacuum advance mechanism. The centrifugal advance mechanism performs the primary function of causing the ignition to occur a predetermined time prior to the top dead center position of each cylinder as a function of engine speed. The vacuum advance system corrects the time of ignition as a function of the air pressure in the intake manifold which is indicative of the engine's load and provides a measure of the quantity of the fuel/air mixture in the cylinder. The operation of these pneumatic-mechanical ignition timing systems is well known and need not be discussed in detail.

The pneumatic-mechanical ignition timing systems are subject to wear and, therefore, less reliable than desired. Consequently, efforts are being undertaken to replace the pneumatic-mechanical ignition systems with electronic ignition timing systems. Various electronic ignition timing systems are known in the art which attempt to duplicate the ignition characteristics of the mechanical systems. Because electronic ignition timing systems cannot compute an ignition or spark advance from a reference signal indicative of the top dead center position of the associated cylinder, most electronic ignition systems use a reference signal which is advanced from the top dead center position, a fixed angular position which is greater than the maximum angular ignition advance required by the engine. The selected advance angle is generally greater than the angle through which the engine rotates, when operating at maximum speed during the predetermined time required for the full power combustion of the fuel/air mixture. The ignition advance time is then computed as a delay from the advanced reference signal.

Both analog and digital electronic ignition timing systems for internal combustion engines are taught by the prior art. Palozzetti et al, in U.S. Pat. No. 3,705,573, disclosed an analog ignition timing system which uses two sensors generating reference signals in advance of the top dead center position of the cylinder. The first sensor generates a reference signal which initiates the generation of a linear ramp voltage and the signal from the second sensor terminates the generation of the ramp signal. The value of the ramp voltage at the occurrence of the second signal is an inverse function of the angular advance required as a function of the engine speed. The generation of the ignition signal is then delayed from the occurrence of the second signal, a period of time inversely proportional to the speed of the engine as well as other engine parameters.

S. R. Finch, in U.S. Pat. No. 3,521,611 July 28, 1970, teaches a comparable type of electronic ignition timing circuit which uses two sensors to generate ignition signals in advance of top dead center as a function of engine torque and engine speed. As with the Palozzetti et al patent, Finch uses a first reference signal and a second reference signal, both angularly advanced of the top dead center position of the piston. The first reference signal initiates the discharge of a capacitor and the second reference signal terminates the discharge and initiates the recharging of the capacitor at a rate proportional to the speed of the engine. The delay in generation of the ignition signal from occurrence of the first reference signal is a direct function of the engine torque and an inverse function of the engine speed.

A third type of electronic ignition timing circuit is disclosed by G. Schirmer et al. U.S. Pat. No. 3,756,212 Sept. 4, 1973. The voltage of a saw tooth signal is compared to the signal generated by an adder circuit receiving input signals indicative of the engine speed, pressure in the engine's intake manifold and other engine parameters which may influence the timing of the ignition. The ignition signals are generated when the potential of the saw tooth signal is equal to the output of the adder circuit. In one embodiment of this circuit, the slope of the saw tooth signal is a function of the engine speed making the instantaneous voltage of the saw tooth signal a function of the angular position of the engine's crankshaft independent of engine speed.

Comparable digital electronic ignition timing circuits for internal combustion engines are taught by G. O. Huntzenger et al. U.S. Pat. No. 3,738,339, R. W. Asplund, U.S. Pat. No. 3,749,073 and H. Wakamatsui et al, U.S. Pat. No. 3,809,029.

The electronic ignition timing systems of the prior art treat the ignition advance as a linear function of engine speed, while it is known that the ignition timing advance, as a function of speed, is nonlinear due to turbulance within the cylinders as well as other factors. The disclosed electronic ignition timing system overcomes the problems of the prior art by treating the advance as a nonlinear function of engine speed and eliminates the need for multiple sensor to generate reference signals for operation of the system.

SUMMARY OF THE INVENTION

The invention is an electronic ignition timing circuit for an internal combustion engine generating ignition signals having the proper advance in the time domain for efficient operation of the engine under all operating conditions. The ignition timing system responds to ignition reference signals, such as generated by a conventional distributor without a mechanical or pneumatic advance or any other sensor generating a signal for each cylinder in the engine indicative of a predetermined position of the associated piston. The ignition reference signals initiate the generation of a charge current in a $\beta_S$ signal generator. The charge current generated by the $\beta_S$ signal generator changes from one predetermined value to another predetermined value at predetermined internal and in a predetermined sequence. The integrated value of the charge current is a nonlinear function of the engine speed indicative of the required ignition advance for efficient operation of the engine. The ignition timing system also receives a load signal, such as a pressure sensor generating a signal indicative of the air pressure in the engine's intake manifold. The load signal is applied to a $\beta_P$ signal generator which generates a discharge current signal indicative of the engine advance as a function of load. The charge current signal is integrated in an ignition time signal generating circuit for the time period between two successive ignition reference pulses. The second ignition reference pulse terminates the integration of the charge current signal and dissipates the integrated signal to a predetermined value at a rate proportional to the discharge current signal. When the integrated signal is dissipated to the predetermined value, the ignition time signal generating circuit generates an ignition signal. The ignition time signal is generated after the occurrence of the second ignition reference signal at a time determinable from the integrated value of the charge current and from the rate at which the integrated signal is dissipated by the signal indicative of the engine's load. The disclosed system also includes a circuit for computing the off time between ignition time signals as a function of speed and logic which terminates the computed advance signal, when the engine is being started or is in the idle mode of operation.

The objective of the invention is an electronic ignition timing circuit generating ignition time signals having advance characteristics determined to produce the most efficient utilization of the power generated by the combustion of the fuel/air mixture. Another objective of the invention is electronic ignition timing circuit in which the ignition advance is a nonlinear function of the engine speed. Still another object is an electronic ignition timing system in which the off time between ignition time signals is sufficient to permit the generation of the high voltage signals for excitation of the spark plugs. A final object is an ignition timing system embodying logic circuitry to terminate the advance of the ignition signals when the engine is in the idle mode of operation or being started. These and other advantages of the disclosed electronic ignition timing system will become apparent from a reading of the specification and claims.

BRIEF DESCRIPTION OF THE DRAWINGS

FIG. 7A is a graph of the integrated charge on capacitances 304 and 306 as a function of time.

FIG. 7B is a graph showing the change in delay time as a function of the discharge rate of capacitances 304 and 306.

DETAILED DESCRIPTION OF THE PREFERRED EMBODIMENT

Figure 1:
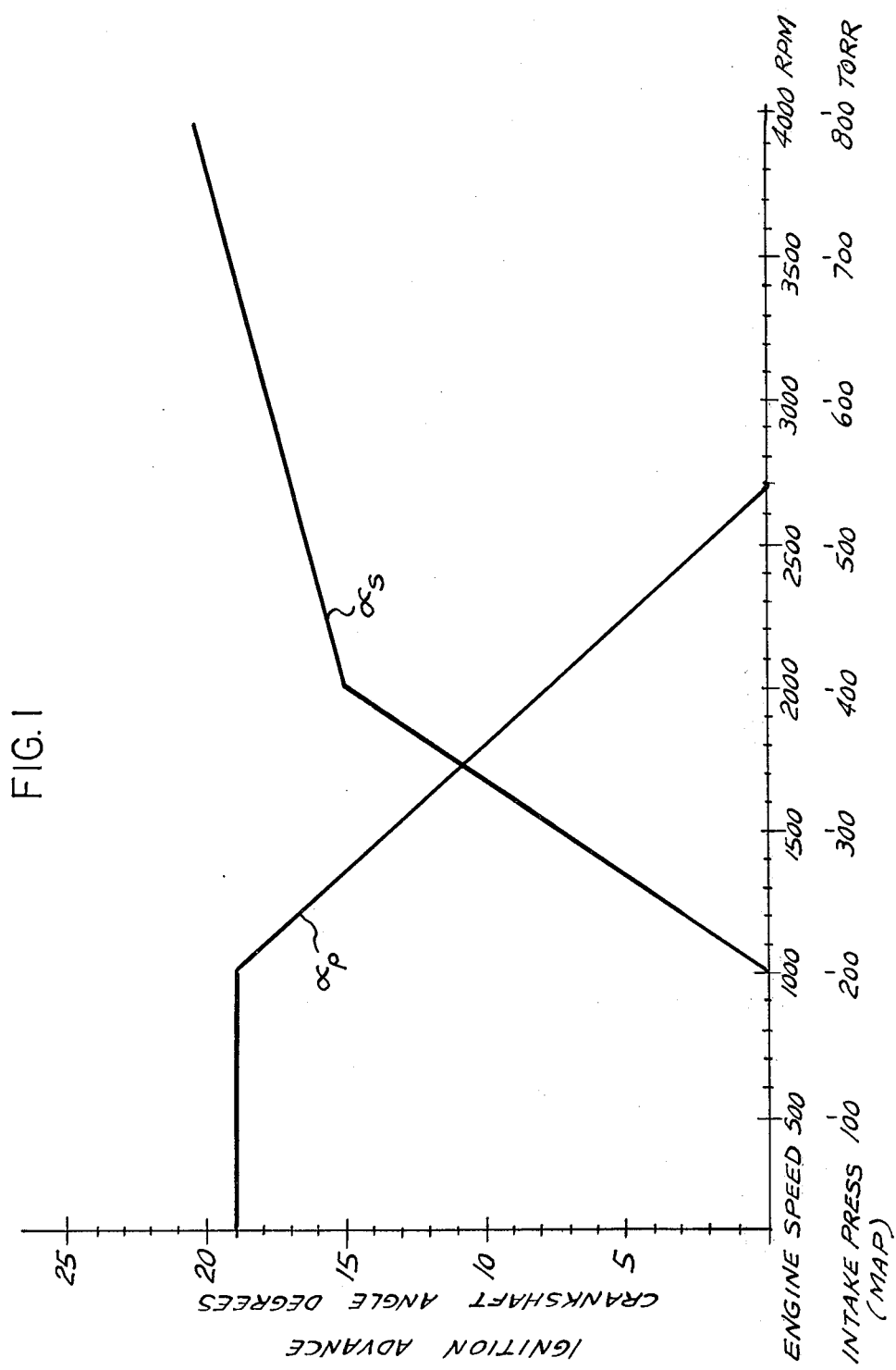
FIG. 1 is a graph showing the angular advance characteristics specified for a typical V-8 type internal combustion engine.

The angular advance of the ignition timing for an internal combustion engine, as a function of engine speed and engine load for a representative eight cylinder automotive internal combustion engine, is shown in FIG. 1. The segmented curve designated $\alpha_P$ is the nominal ignition or spark advance in terms of engine crank angle from the top dead center position of the piston required for efficient operation of the engine as a function of pressure in the engine's air intake manifold. As is known in the art, the intake manifold absolute pressure (MAP) is indicative of the engine's load. The segmented curve designated $\alpha_S$ is the nominal ignition advance in terms of engine crank angle required for efficient operation of the engine as a function of engine speed (N) measured in revolutions per minute (RPM). The segmented curves $\alpha_P$ and $\alpha_S$ are typical of the curves experimentally determined for internal combustion engines and are representative of the design objectives of mechanical spark advance systems and electronic ignition timing circuits.

Electronic ignition timing systems operate in the time domain rather than the angle domain, therefore, it is convenient to transpose the curves $\alpha_P$ and $\alpha_S$ to the time domain. Further, electronic circuits are not capable of producing, in real time, a signal which precedes the associated reference signal, therefore, ignition advance is computed as a delay from a preceding reference signal. Finally, it is convenient to combine the curves $\alpha_S$ and $\alpha_P$ to generate a family of delay $\beta$ curves having the characteristics of the $\alpha_S$ curve at various predetermined intake manifold pressures, as shown on FIG. 2. The delay $\beta$ curves designated $\beta_M$ and $\beta_m$ represent the extremes of the family of $\beta$ curves for an eight cylinder engine generating an ignition reference signal for each piston as the respective piston reaches its top dead center position. The delay curve $\beta_M$ is a transposition of the $\alpha_S$ curve of FIG. 1 for an intake manifold pressure of 540 Torr at which pressure in the ignition advance due to the pressure in the intake manifold becomes negligible. The delay curve $\beta_m$ is a transposition of the $\alpha_S$ curve for an intake manifold pressure of 200 Torr where the ignition advance, due to manifold pressure, effectively becomes a constant value. The engine speed corresponding to the time between ignition reference signals is shown to provide a cross reference between the $\alpha_S$ curve of FIG. 1 and the $\beta$ curves of FIG. 2. The actual ignition advance in the time domain of FIG. 2 is the time difference between two successive ignition reference signals and the time delay determined from the $\beta$ curve for the particular manifold pressure.

Figure 2:
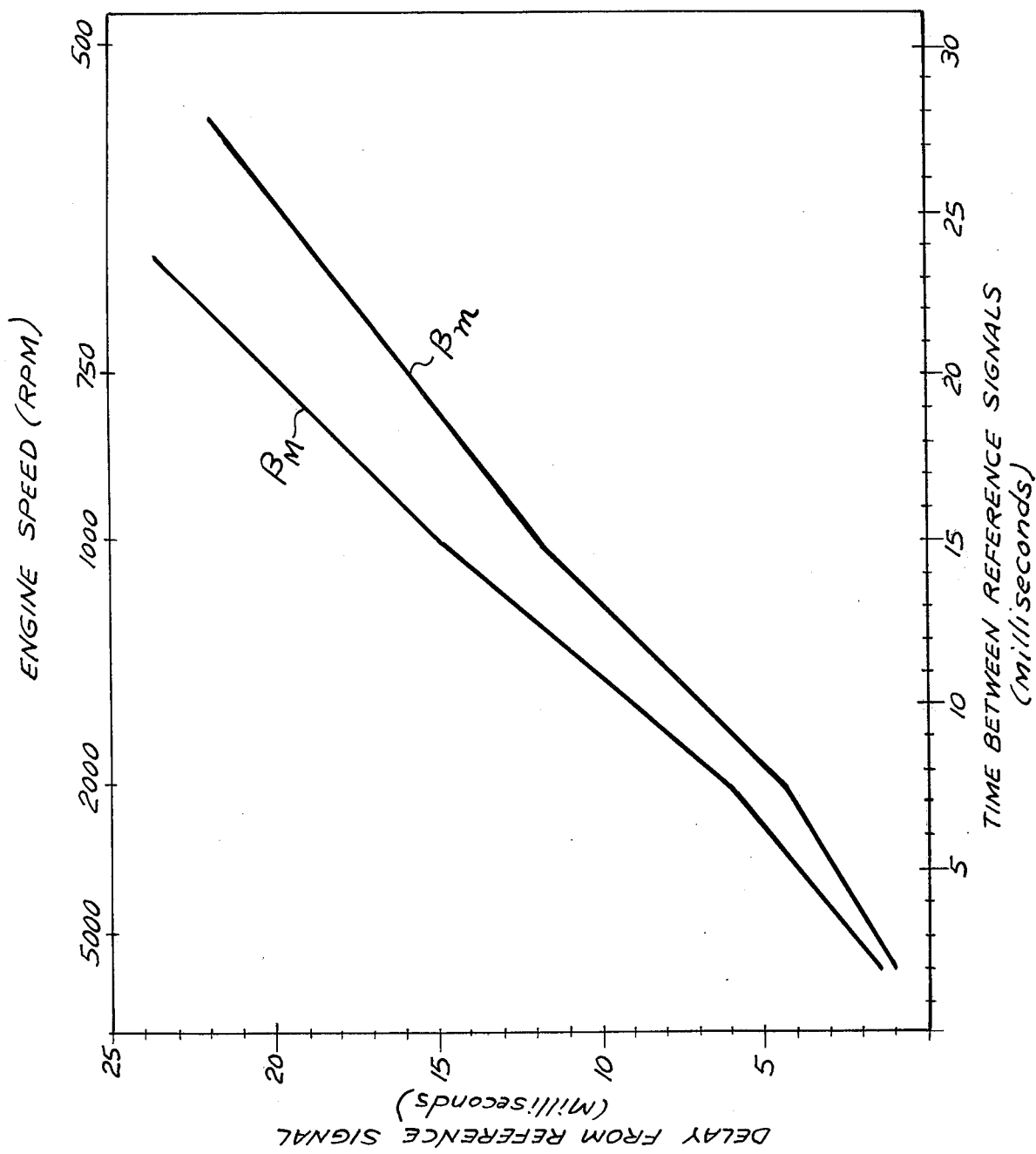
FIG. 2 is a graph of the data shown in the time domain.
Figure 3:
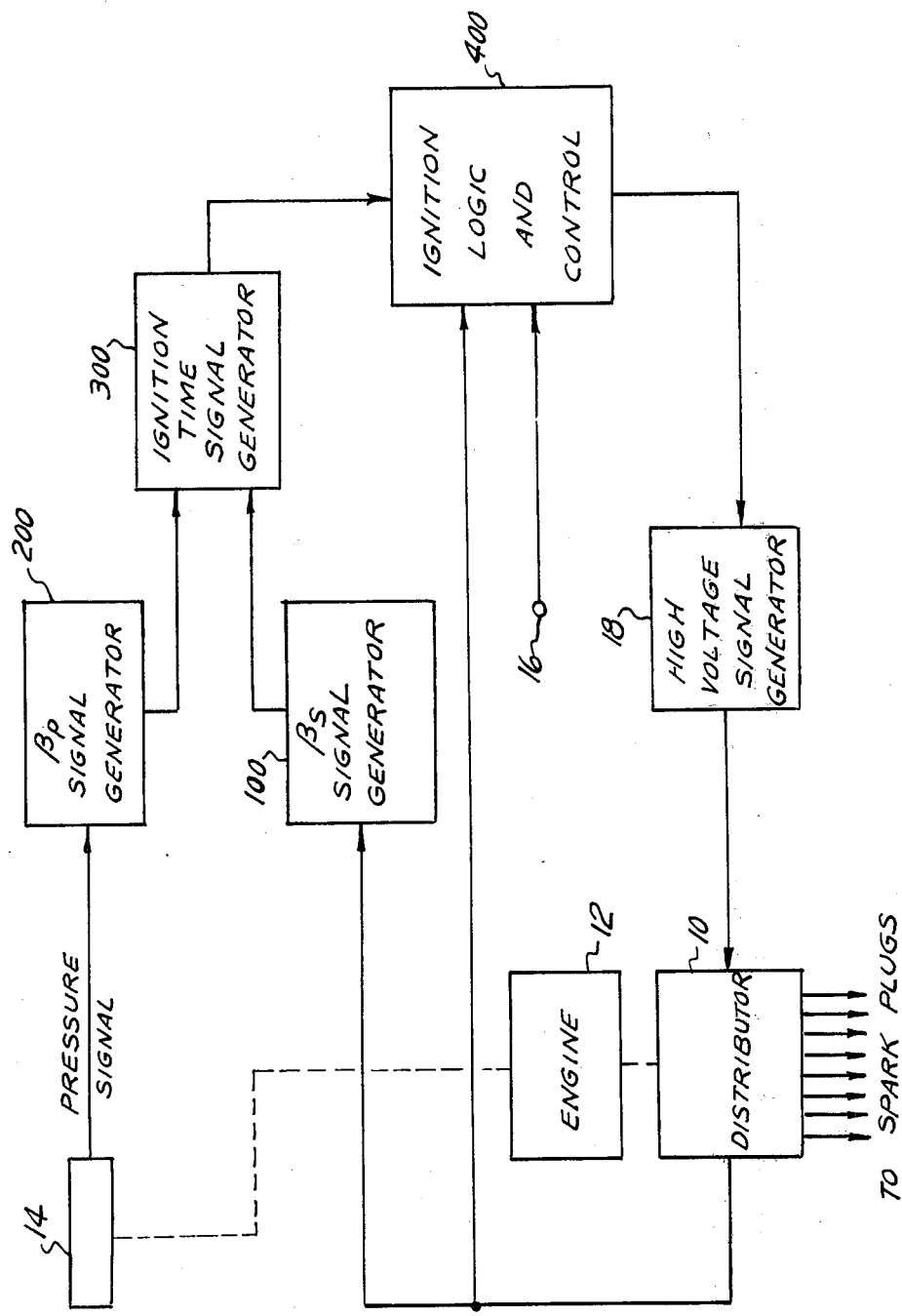
FIG. 3 is a basic block diagram of the disclosed electronic ignition timing system.

An electronic ignition timing system capable of generating ignition signal having an advance in accordance with the engine requirements, as defined by the delay $\beta$ curves of FIG. 2, is shown in the block diagram of FIG. 3. Referring to FIG. 3, the ignition timing system comprises a signal generator, such as distributor 10 mechanically linked to the crankshaft of the engine 12 in a predetermined time relationship. The distributor 10 generates an ignition reference signal for each cylinder in the engine when the associated piston is in a predetermined position. The ignition reference signals are communicated to a $\beta_S$ signal generator 100 which generates a $\beta_S$ signal indicative of ignition delay as a function of engine speed. A sensor such as pressure sensor 14 detecting the engine's load provides a pressure signal to a $\beta_P$ signal generator 200. The $\beta_P$ signal generator generates a $\beta_P$ signal indicative of the ignition delay as a function of engine load which in the instant embodiment is the pressure in the engine's intake manifold. The $\beta_S$ and $\beta_P$ signals are input along with the ignition reference signal into the ignition time signal generator 300 which generates an ignition time signal having a delay after an ignition reference signal determined by the $\beta_S$ and $\beta_P$ signals. The ignition time signal, along with an ignition reference signal and a signal indicative of a start attempt from terminal 16, are input into an ignition logic and control circuit 400 which computes the off time of the ignition signal as a function of engine speed and terminates the delayed ignition signal when the engine is either in the start or idle mode of operation. In the start and idle mode of operation the ignition reference signal is output directly. The ignition time signal or the ignition reference signal is input to the high voltage signal generator 18 which generates a high voltage signal distributed to the individual spark plugs (not shown) in the proper sequence by the distributor 10.

The operation of the electronic timing system is as follows: The distributor 10 generates ignition reference signals synchronous with the rotation of the crankshaft of engine 12 and indicative of when each piston in the engine obtains a predetermined position during the engine's operational cycle. In the preferred embodiment the ignition reference signals are generated when each piston reaches its top dead center position immediately preceding its power stroke. The location of the piston when the ignition reference signal is generated, however, may be any other predetermined position.

A first ignition reference signal received by the $\beta$ signal generator 100 initiates the generation of a $\beta_S$ signal having an integrated value indicative of the ignition delay as a function of time, as indicated by one of the $\beta$ curves of FIG. 2. The $\beta_S$ signal may have a value indicative of the $\beta_M$ curve, the $\beta_m$ curve, or any intermediate $\beta$ curve. The $\beta_S$ signal is integrated in the ignition time signal generator 300 until the occurrence of a second ignition reference signal. The second ignition reference signal terminates the integration of the $\beta_S$ signal in the ignition time signal generator 300 and initiates the generation of the ignition time signal delayed from the occurrence of the second ignition reference signal a period of time proportional to the value of the integrated $\beta_S$ signal and the value of $\beta_P$ signal received from the $\beta_P$ signal generator 200. The second ignition reference signal also reinitiates the generation of the $\beta_S$ signal in the $\beta_S$ signal generator for the next ignition time signal to be generated by the ignition time signals generator 300.

The ignition time signal is then modified in the ignition logic and control 400 to have an off time between ignition time signals sufficient for the generation of the high voltages for energizing the spark plugs. The ignition logic and control 400 also responds to the ignition reference signal and start attempt signals and applies the ignition time signal to the high voltage signal generator 18 when the engine is running and not in an idle mode of operation. Alternately, the ignition logic and control applies the ignition reference signal to the high voltage signal generator 18 during the idle operation and attempts to start the engine. In the preferred embodiment the ignition reference signals have no advance component, therefore, during a start attempt or when the engine is idling, ignition takes place at top dead center position of the piston. When the ignition reference signals are generated at positions other than top dead center, then auxiliary circuits, not shown, would be required to advance or delay the ignition reference signals to have a predetermined relationship to the top dead center position of the piston. The signal from the ignition logic and control 400 is input to the high voltage signal generator 18 which generates the high voltage pulse distributed by distributor 10 to the individual spark plugs in a conventional manner.

Figure 4:
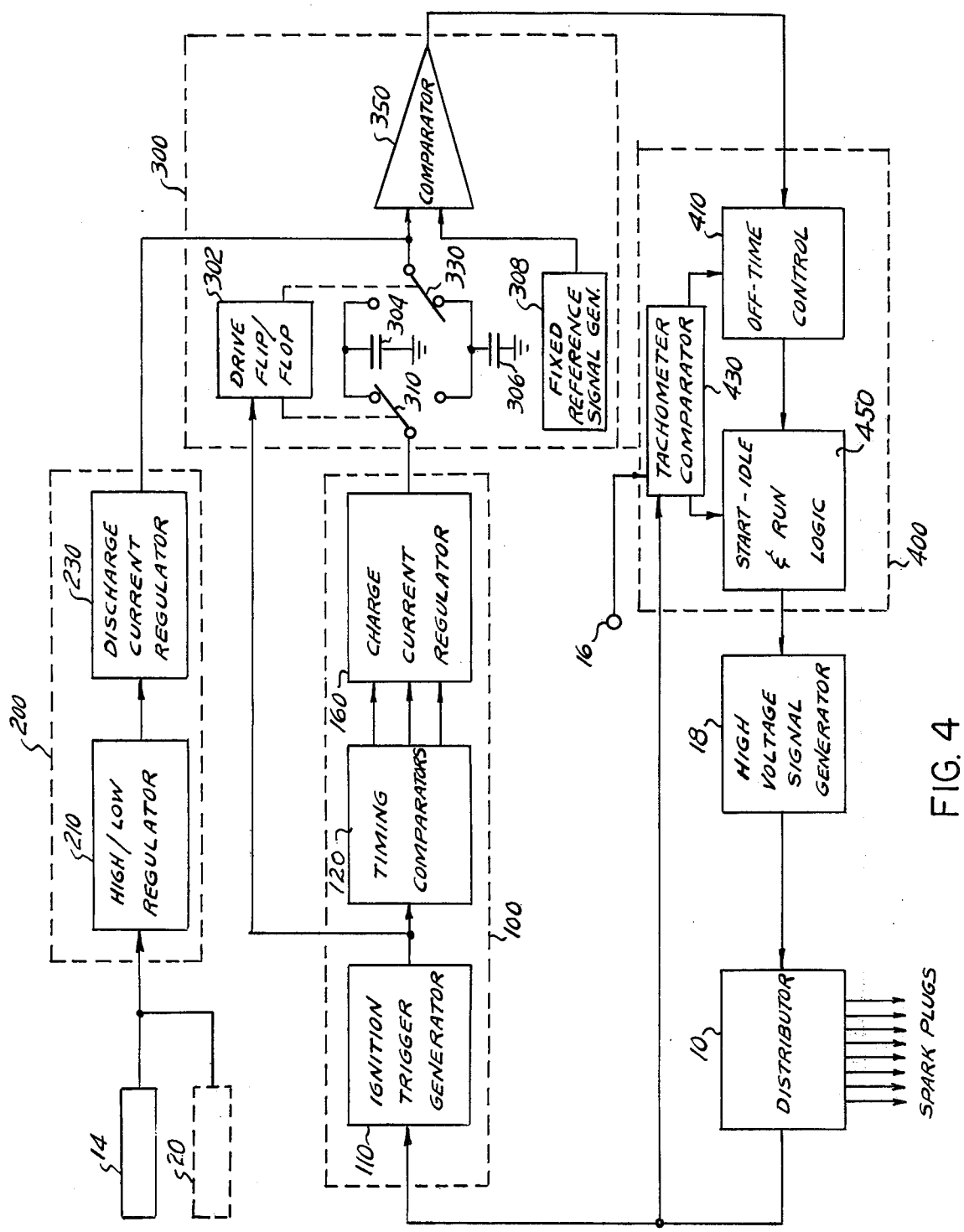
FIG. 4 is a detailed block diagram of the electronic ignition timing system of FIG. 3.

The electronic ignition timing system is shown in more detail in the block diagram illustrated in FIG. 4. As in FIG. 3, the ignition reference signals from the distributor 10 are input into the $\beta$ signal generator 100 comprising an ignition trigger generator 110, timing comparators 120 and charge current regulator 160. The signal from the pressure sensor 14 is input into the $\beta$ signal generator 200 comprising high/low regulator 210 and discharge current regulator 230. A signal from the ignition trigger generator is input into a driver flip flop 302 of the ignition signal generator 300. The output current from the charge regulator 160 is input into an electronic switch illustrated as a signal pole, double throw mechanical switch 310 which performs the same electrical function. The single pole switch 310 charges either capacitor 304 or 306 depending upon the position of the switch. The discharge of the capacitor 304 or 306 is accomplished by a comparable electronic switch, again, illustrated as a single pole, double throw mechanical switch 330 by means of discharge current regulator 230. The function of the switches 310 and 330 are controlled by the driver flip flop 302. The charge signal on capacitor 304 or 306 is communicated to the input of a comparator 350 where the charge signal is compared with a fixed reference signal from a fixed reference signal generator 208. As is known in the art, comparator 350 is an electronic device which generates an output signal when the voltage or signals on the two input terminals become equal. The output of the comparator 350 is applied to the off time control 410 of the ignition logic and control 400. The off time control 410 determines the off time of the signals generated by the comparator as a function of the engine's speed. The engine speed is determined from the ignition reference signals by a tachometer comparator 430 which generates a signal indicative of the engine speed. The tachometer comparator 430 also compares the engine speed with a fixed reference and generates a signal when the engine speed is indicative of the engine being in the idle mode of operation. The signal, indicative that the engine is in the idle mode, is communicated along with the ignition signal from the off time control and the start idle and run logic 450. The tachometer and comparator circuit also receives a start signal from terminal 16 which is indicative that the attempt is being made to start the engine and generates a signal indicative of the start attempt to the start idle and run logic circuit. The start, idle and run circuit determines the operation state of the engine and communicates the ignition time signal from the off time control 410 to the high voltage signal generator 18 when the engine is running at a speed greater than the idle speed and communicates to the high voltage signal generator 18 the ignition reference signal when the engine is in the start or idle mode of operation. The high voltage signal generator 18 operates in a conventional manner and generates a high voltage signal which is distributed by the distributor 10 to the individual spark plugs, not shown, as is conventionally accomplished in internal combustion engine systems.

The operation of the system is as follows. The ignition reference signal is converted by the ignition trigger generator into a pulse signal having predetermined potential and a predetermined duration. This trigger pulse signal is applied to the driver flip flop 302 of the ignition time signal generator 300 causing the flip flop to change state and switch the electronic switches 310 and 330. The ignition trigger pulse is also applied to the timing comparators 120 which generate a plurality of signals, each signal indicative of a predetermined time interval after the occurrence of the trigger pulse. The signals from the timing comparators 120 are communicated to the charge current regulators circuit 160 which generates a charge current which is a function of the time interval after the occurrence of the trigger pulse. The output charge current from the charge current regulator 160 charges capacitor 304 or 306 depending upon the state of the electronic switch 310 controlled by the driver flip flop 302. Referring to FIG. 2, the timing comparators in the instant embodiment would generate signals indicative of three time intervals. It is recognized that the $\beta$ curves may be segmented differently than shown and the $\beta$ curves may have only two linear segments or may have four or more segments depending upon the characteristics of the particular engine and the degree of ignition timing control desired. The invention is not limited to the three segment $\beta$ curves of FIG. 2. The number of time intervals to be generated by the timing comparators 120 is directly proportional to the number of linear segments on the $\beta$ curve. Referring back to the three segment $\beta$ curves of FIG. 2, the first time interval being from the occurrence of the ignition trigger signal to 7.5 milliseconds, the second time interval being from 7.5 milliseconds to 15 milliseconds and third time interval being 15 milliseconds and greater. When the first signal, indicative of the first time interval, is applied to the charge current generator, the charge current generator 160 generates a charge current which charges capacitor 304 or 306 at a rate indicative of the first portion of the $\beta$ curve shown on FIG. 2. Upon the occurrence of a signal indicative of the second time interval, the charge current generator generates a charge current which is indicative of the slope of a second portion of the $\beta$ curve from 7.5 milliseconds to 15 milliseconds and during the presence of a signal indicative of a third time period, the charge current regulator generates a charge current indicative of the third section of the $\beta$ curve. By using this technique the charge on capacitors 304 or 306 from the charge current generator is an electric signal indicative of the delay determined from the $\beta$ curves of FIG. 2. The electronic switches 310 and 330 are operated in a manner such that when one capacitor is being charged from the charge current regulator 160, the other capacitor is being discharged from the discharge current regulator 230. The driver flip flop 302 changes state in response to a trigger signal and reverses the state of switches 310 and 330 so that the capacitor being charged is subsequently discharged and the capacitor that was being discharged is charged. The output signal from the capacitor being discharged by means of switch 330 is applied to the input into comparator 350 and compared with the fixed referenced voltage generated by reference voltage generator 308. When the charge on a capacitor being discharged is dissipated to a value equal to the fixed reference signal, the comparator 350 generates an ignition time signal communicated to the off time control 410. The off time control is a one shot multivibrator having its off time controlled by the signal indicative of the engine speed from the tachometer comparator 430. The function of the off time control is to control the off time of the ignition time signal so that there is sufficient off time between successive ignition time signals to permit the high voltage signal generator 18 to generate the required high voltage ignition signal. The output signal from the off time control 410, as previously indicated, is applied into the start idle and run logic 450 and is communicated to the high voltage signal generator 18 when the engine is running at a speed greater than the idle speed. The tachometer comparator 430 generates a signal when the engine is in the idle mode of operation which blocks out the ignition time signals from the off time control 410 and the high voltage signal generator 18 is activated in response to the ignition reference signals. The system also includes a means for blocking out the ignition time signal when the engine is being started. The start signal received on terminal 16, like the idle signal, blocks the ignition time signal and the high voltage signal generator 18 is activated by ignition reference signals. The output of the high voltage signal generator 18 is communicated to the distributor 10 which distributes the ignition signal to the respective spark plugs in synchronism with the rotation of the engine. In addition to the engine speed and load, the ignition timing system may also receive inputs from other engine parameters such as a temperature sensor generating signals indicative of the engine's temperature or a nitrous oxide ($NO_x$) sensor generating a signal indicative of the high order nitrous oxides being generated by the engine. These additional inputs could be summed with load signal to further control the ignition timing of the engine to reduce the generation of undesirable pollutants. The dashed box 20 on FIG. 4 is indicative of such an additional input to the ignition timing system.

Figure 5:
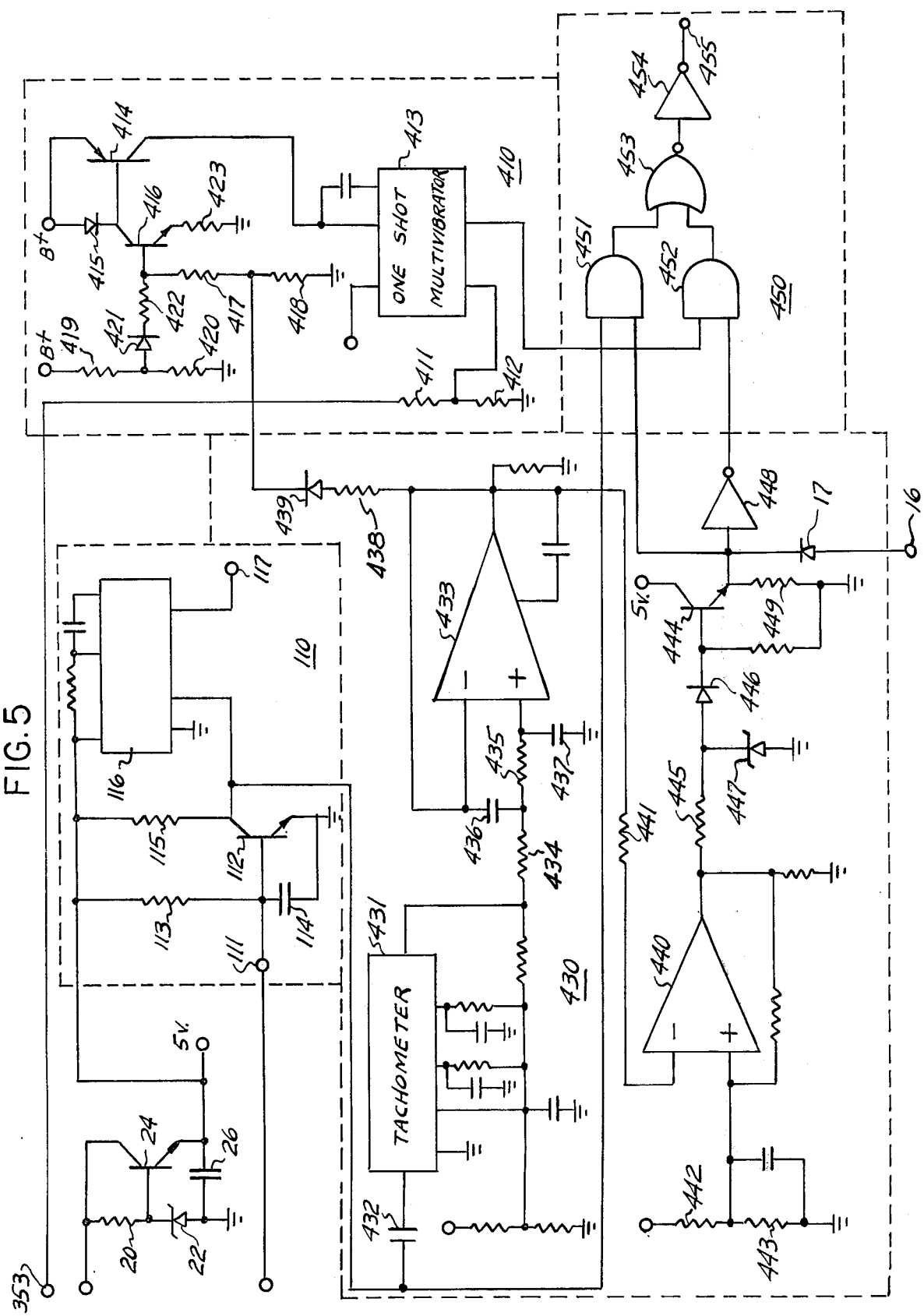
FIGS. 5 and 6 are detailed electrical schematics of the electronic ignition timing system of FIG. 4.
Figure 6:
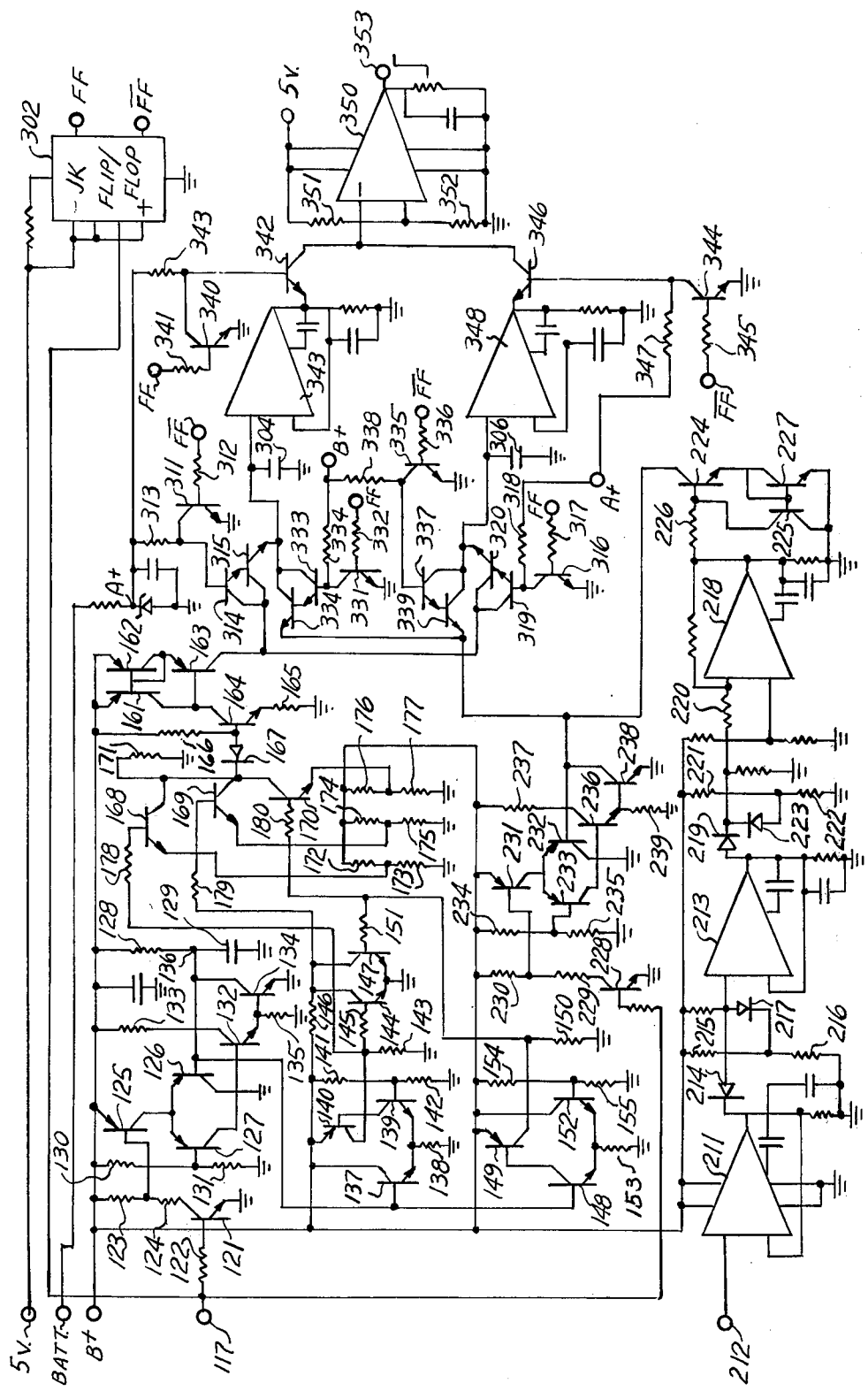

Details of the circuits depicted in block form on FIG. 4 are shown on FIGS. 5 and 6. The illustrated circuits receive electrical power from a battery or engine driven source such as an alternator or generator conventionally used with internal combustion engines. The electrical power is applied to circuits at points designated as B+ at various locations on the FIGS. In the preferred embodiment the B+ voltage is filtered and may have a value different from the actual battery potential. Further, many of the integrated circuits and logic elements embodied in these circuits require a five volt power source, therefore, a five volt power source comprising resistance 20, Zener diode 22, transistor 24 and capacitor 26 is included on FIG. 5. The five volt power supply is shown energizing the ignition trigger generator circuit 100. Also illustrated, with respect to the five volt power source, is a five volt terminal which is connected to the five volt terminals designated elsewhere in the FIGS. 5 and 6.

Referring now to FIG. 5, the ignition trigger generator circuit 110 comprises an input terminal 111 connected to the base of a transistor 112. The base of the transistor 112 is connected to the five volt power supply through resistance 113 and the capacitance 114 is connected to ground. The collector of transistor 112 is connected to the five volt power supply through resistance 115 and emitter of the transistor 112 is connected to ground. The collector of transistor 112 is also connected to the input of one shot multivibrator 116 which produces the ignition trigger signal having a predetermining amplitude and predetermined duration in response to an ignition reference signal. The details of the one shot multivibrator are sufficiently known to those skilled in the art and need not be shown in detail. The output of the multivibrator 116 appears on an output terminal 117.

Turning now to FIG. 6, the timing comparator 120 comprises a calibrated discharge circuit and three comparator circuits. The calibrated discharge circuit receives the ignition signal from terminal 117 trigger. Terminal 117 is connected to the base of a transistor 121 through resistance 122. The emitter of transistor 121 is connected to ground. The collector of transistor 121 is connected to ground. The collector of transistor 121 is connected to a B+ power supply through resistances 123 and 124. The collector of transistor 121 is also connected to the base of transistor 125 through resistance 124. The emitter of a transistor 125 is connected to B+ and the collector of transistor 125 is connected to the emitters of transistor 126 and 127. The base of transistor 126 is connected to a junction between resistance 128 and capacitance 129 forming an RC timing network between B+ and ground. The collector of transistor 126 is connected to ground. The base of transistor 127 is connected to the junction of resistance divider circuit consisting to the base of transistor 132. The collector of transistor 132 is connected to B+ through a resistance 133. The emitter of transistor 132 is connected to the base of transistor 134 and to ground through resistance 135. The collector of transistor 134 is connected to the junction 136 between resistance 128, capacitance 129 and the emitter of transistor 134 is connected to ground.

The operation of the discharge network is as follows. The ignition trigger signal applied to base of transistor 121 places transistor 121 and transistor 125 in the conductive state. With transistor 125 in the conductive state, transistors 127, 132 and 134 are rendered conductive and discharge capacitance 129. When the trigger pulse is terminated, transistor 121 and 125 are blocked effectively blocking transistors 127, 132 and 134. With transistors 125, 126 and 134 blocked, capacitance 129 is charged through resistance 128. The potential at junction 136, indicative of the charge on capacitance 129, is a signal indicative of the time after the occurrence of an ignition trigger pulse.

The first comparator comprises transistor 137 having its base connected to the junction 136. The collector of transistor 137 is connected to B+ and the emitter is connected to ground through a resistance 138 and to the emitter of the transistor 139. The collector of transistor 139 is connected to the base of transistor 140. The base of transistor 139 is connected to the junction of resistance divider circuit consisting of resistances 141 and 142. The collector of transistor 140 is connected to ground through a resistance 143 and to the base of transistor 144 through a resistance 145. The collector of transistor 144 is connected to B+ through the resistance 146 and the emitter of transistor 144 is connected to the emitter of the transistor 147 and to ground. The collector of transistor 147 is also connected to the B+ through resistance 146.

The third comparator comprises transistor 148 having its base connected to the junction 136 between resistance 128 and capacitance 129 in the calibrated discharge network. The collector of transistor 148 is connected to the base of transistor 149. The emitter of transistor 149 is connected to B+. The collector of transistor 149 is connected to ground through resistance 150 and to the base of transistor 147 through resistance 151. The emitter of transistor 148 is connected to the emitter of transistor 152 and to ground through a resistance 153. The collector of transistor 152 is connected to B+ and the base of transistor 152 is connected to the junction of a resistance divider comprising resistance 154 and 155.

The charge current regulator 160 comprises transistor 161 and 162 having their bases collectively connected to the emitter of transistor 163. The emitters of transistors 161 and 162 are connected to B+. The collector of transistor 162 is also connected to the emitter of transistor 163. The collector of transistor 161 is connected to the base of transistor 163 and the collector of transistor 164. The emitter of transistor 164 is connected to ground through resistance 165. The base of transistor 164 is connected to B+ through a resistance 166 and to one end of diode 167. The other end of diode 167 is connected to the collectors of transistors 168, 169 and 170 and to ground through resistance 171. The emitter of transistor 168 is connected to the center junction of a voltage divider network between B+ and ground consisting of resistances 172 and 173. The emitter of transistor 169 is connected to the center junction of a voltage divider network between B+ and ground consisting of resistances 174 and 175. The emitter of transistor 170 is connected to the center junction of a voltage divider network between B+ and ground comprising resistances 176 and 177. The base of transistor 168 is connected through a resistance 178 to the collector of transistor 140. The base of transistor 169 is connected through resistance 179 to the collectors of transistors 144 and 147. The base of transistor 170 is connected through a resistance 180 to the collector of transistor 149.

The combined operation of the comparator circuits and charge current regulator is as follows. In the discharged state of capacitance 129 a low potential appears at the base of transistors 137 and 148. In the first comparator circuit transistors 140 and 139 are in a conductive state and a potential is developed across resistance 138 which is higher than the voltage across the capacitors 129, therefore, transistor 137 remains in the block state and the potential appearing at the base of transistor 168 is higher than the potential at the emitter, as determined by resistance network comprising resistors 172 and 173, therefore, transistor 168 conducts and determines the potential at the base of transistor 164. The conductance of transistance 164 determines the potential at the base of transistor 163 and, therefore, the value of the current output of the current regulator. When the potential across capacitor 129 exceeds the potential developed across resistance 138, transistor 137 begins to conduct and raises the potential of the emitter of transistor 139 above the potential of the resistance divider consisting of resistance 141 and 142 and transistor 139 becomes blocked. Blocking of transistor 139 blocks transistor 140 and the potential at the base of transistor 168 becomes low and transistor 168 blocks and the output current of the current regulator is no longer dependent on the conductance of transistor 168.

Referring now to the seoncd comparator, when transistor 140 is conducting a potential at the base of transistor 144 is high and transistor 144 is in the conductive state and the potential at the collector of transistor 144 is low, therefore, the potential at the base of transistor 169 is low, therefore, transistor 169 is in the block state. However, when transistor 140 ceases to conduct, transistor 144 becomes blocked and the potential at the base of transistor 169 becomes high and the output current of the regulator, as described before, is now controlled by the conductance of transistor 169.

Referring now to the third comparator, the potential across capacitance 129 is applied to the base of transistor 148. The potential across the resistance 153 is controlled by the conductance of transistor 152. The base potential of transistor 152 is controlled by the resistance divider network 154 and 155. When the potential on capacitance 129 is less than the potential at the emitter of transistor 152, transistor 148 remains in the block state. As long as the potential of capacitor 129 is below a potential at the emitter of transistor 152, determined by a potential drop across resistance 153, transistor 148 is blocked. Transistor 148 in the blocked state also blocks transistor 149 and the potential at the collector of transistor 149 and the potential applied to the base of transistors 147 and 170 is low and, therefore, transistors 147 and 170 are nonconductive. From the time the transistor 137, the first comparator, starts to conduct to to time tht the transistor 148 in the third comparator starts to conduct, the potential applied to the bases of the two transistors 144 and 147 in the second comparator is low, therefore, transistors 144 and 147 are blocked and the potential applied to the base of transistor 169 is high and the output current of the current generator is controlled by the conductance of transistor 169. When the potential across capacitance 129 rises sufficiently high to cause transistor 148 to conduct, transistor 149 conducts and the potential at the collector of transistor 149 becomes high. This high potential is communicated to the base of transistor 147 and causes transistor 147 to conduct and places a low potential at the base of transistor 169 blocking transistor 169. The high potential at the collector of transistor 144 is also applied to the base of transistor 170 causing transistor 170 to conduct. In this state transistor 168 is blocked, transistor 169 is blocked and transistor 170 is conducting and now controls the base potential of transistor 164 and the output of transistor 163 of the current regulator circuit. In this way the β signal generator circuit 100 generates in the time domain current signals having different value for different time intervals.

The circuit details of the ignition signal generator 300 are shown in FIG. 6. The circuit comprises a JK flip flop 302 receiving an ignition trigger pulse from terminal 117. The flip flop 302, in response to the trailing edge of the ignition trigger pulse, alternatively produces a signal on one of two outputs, one output is designated FF and the other is designated $\overline{FF}$ (not FF). The two outputs FF and $\overline{FF}$ are connected to the circuits at various locations so designated and operate the electronic switches 310 and 330. The switch 310 comprises a transistor 311 receiving a $\overline{FF}$ signal from flip flop 302 at its base through resistance 312. The emitter of transistor 311 is connected to ground and the collector of transistor 311 is connected to the regulated A+ voltage source derived from the battery power supply through a resistance 313 and to the base of transistor 314. The collector of transistor 314 is connected to the collector of a transistor 315 and to the collector of transistor 163 in the current regulator circuit. The emitter of transistor 314 is connected to the base of transistor 315. The emitter of transistor 315 is connected to one side of capacitor 304, the other side of capacitor 304 is connected to ground. A like circuit comprising transistors 316, resistance 317, resistance 318, transistors 319 and transistor 320 having its emitter connected to one terminal of capacitance 306. The other end of capacitance 306 is connected to ground. Another network comprising the electronic switch 330 comprises transistor 331 having its base connected to the FF terminal of the JK flip flop 302 by means of resistance 332. The emitter of transistor 331 is connected to ground. The collector of transistor 331 is connected to the base of a transistor 333 and to the A+ voltage source through a resistance 334. The emitter of transistor 333 is connected to the base of transistor 334. The collector or transistors 333 and 334 are connected together and are connected to the terminal of capacitance 304 opposite ground. The emitter of transistor 334 is connected to the β signal generator 200. Switch 330 also has a transistor 335 receiving a $\overline{FF}$ signal from the JK flip flop 302 through a resistance 336. The collector of transistor 335 is connected to the base of transistor 337 and to the A+ voltage source through a resistance 338 and the emitter of transistor 335 is connected to ground. The emitter of transistor 337 is connected to the base of a transistor 339. The collectors of transistors 337 and 339 are connected together and to the terminal of capacitance 306 opposite ground. The emitter of transistor 339 is also connected to the β signal generator 200.

Switch 330 also comprises a transistor 340 having its base connected to the FF terminal of flipflop 302 by means of a resistance 341. The emitter of transistor 340 is connected to ground and the collector of transistor 340 is connected to a base of a transistor 342 and to the A+ voltage source through a resistance 343. The emitter of transistor 342 is connected to the output operational amplifier 343 functioning as a voltage follower. Operational amplifier 343 receives an input signal from the terminal of capacitance 304 opposite ground. In the like manner, transistor 343 receives a $\overline{FF}$ signal from the flip flop 302 through a resistance 345. The emitter of transistor 344 is connected to ground. The collector of transistor 344 is connected to the base of transistor 346 and to the A+ voltage source through a resistance 347. The emitter of transistor 346 is connected to the output of an operational amplifier voltage follower 348 receiving an input from the terminal of capacitance 306 opposite ground. The collectors of transistors 342 and 346 are connected to the negative input of a voltage comparator 350. The voltage comparators receive a reference signal at the plus input terminal from the fixed reference signal generator 308. Fixed reference signal generator 308 comprises a voltage divider network consisting of resistances 351 and 352 connected between A+ and ground. The details of comparator circuit 350 are well known in the art and need not be explained in detail. The comparator compares the signal at the two terminals and generates an output signal at terminal 353 when the two signals are equal.

The details of the $\beta$ signal generator 200 are also shown on FIG. 6. The high/low limit regulator circuit 210 comprises a first operational amplifier 211 receiving a signal indicative of the manifold pressure signal on terminal 212. The output of the first operational amplifier 211 is connected to the positive input of the second operational amplifier 213 by means of diode 214. The maximum positive signal supplied to amplifier 213 is controlled by the resistance divider network 215 and 216 connected between A+ and ground. The positive input to operational amplifier is connected to the junction between resistance 215 and 216 by means of a diode 217. When the signal from the operational amplifier 211 is higher than the reference potential at the junction between resistances 215 and 216, the diode 217 conducts and effectively limits the maximum signal applied to operational amplifier 213. The output of operational amplifier 213 is applied to the negative input of operational amplifier 218 by means of diode 219 and resistance 220. The minimum signal applied to amplifier 218 is controlled by a resistance divider network comprising resistances 221 and 222 connected between A+ and ground. A diode 223 connected to the junction between resistances 221 and 222 is connected to the input of operational amplifier through resistance 220. When the output signal of operational amplifier 213 falls below a predetermined value determined by resistance networks 221 and 222, diode 223 conducts and applies a minimum signal level to the input of operational amplifier 218. The output of the operational amplifier 218 is connected to the base of transistor 224 and to the collector of transistor 225 through a resistance 226. The collector of transistor 224 is connected to the capacitors 304 and 306 through transistors 334 and 338 respectively. The emitter of transistor 224 is connected to the base and collector of transistor 227 and the base of transistor 225. The emitters of both transistors 225 and 227 are connected to ground forming the current drain circuit operative to discharge capacitances 304 and 306 when transistors 334 or 338 are conductive in response to the state of flip flop 302.

Parallel to this current drain circuit is a calibration discharge circuit comprising transistor 228. The base of transistor 228 is connected to the ignition trigger terminal 117 and the emitter is connected to ground. The collector of transistor 228 is connected to B+ through series resistances 229 and 230. Transistor 231 has its base connected to the junction between resistances 229 and 230. The emitter of transistor 231 is connected to the emitters of transistors 232 and 233. The collector of transistor 232 is connected to ground and the base is connected to the collector of transistor 224. The base of transistor 233 is connected to the junction between resistances 234 and 235 forming a divider network between B+ and ground. The collector of transistor 233 is connected to the base of transistor 236. The collector of transistor 236 is connected to B+ through resistance 237. The emitter of transistor 236 is connected to the base of transistor 238 and to ground through resistance 239. The emitter of transistor 238 is connected to ground and the collector of transistor 238 is connected to capacitances 304 and 306 through transistors 234 and 238 respectively.

The operation of the $\beta$ signal generator is as follows. The pressure signal on terminal 212 is impedance buffered by operational amplifier 211. By means of voltage divider network comprising resistances 215 and 216 and diode 217, the maximum output voltage of the operational amplifier 211 is limited by diode 217 to the voltage at the junction between resistances 215 and 216. The minimum value of the output signal from operational amplifier 213 is determined by the voltage divider network comprising resistances 221 and 222 and diode 223. The value of the input signal operational amplifier 218, therefore, has a maximum high and minimum low value. The output of amplifier 218 is applied to the base of transistor 224 and controls the current discharging capacitance 304 and 306 through transistors 224 and 227.

Upon the occurrence of an ignition trigger pulse, transistor 228 is rendered conductive which renders transistor 231 conductive. The conductance of transistor 231 causes transistor 233, 236 and 239 to become conductive also. The conductance of transistor 239 short circuits the current path from capacitances 304 and 306 directly to ground discharging these capacitors to a predetermined level prior to the charging of the state of the switch 310 by the flip flop circuit 302.

The electrical charge on the capacitor 304 and 306, as a result of the operation of $\beta_S$ and $\beta_P$ signal generators, is illustated on FIGS. 7A and 7B. Upon the occurrence of a trigger signal, the capacitor is discharged to a predetermined value by the calibrated discharge circuit during the time interval of the ignition trigger signal. The trailing edge of the ignition trigger signal, time B, triggers switches 310 and 330 to change state, and the current regulator starts to charge capacitance 304 and 306 depending upon the state of the switch 310 at a rate $b$ determined by the conductance of transistor 163 in response to the conductance of transistor 168 and the voltage divider network comprising resistances 172 and 173. After a predetermined period of time, time C, transistor 168 is blocked and transistor 169 becomes conductive and the charge rate of the capacitor, segment $c$, is then controlled by the conductance of transistor 169 and resistances 174 and 175. After a third predetermined time interval, time D, transistor 169 becomes blocked and transistor 170 becomes conductive and the charge rate, segment d, is determined by the conductance of transistor 170 and the potential of the voltage divider network consisting of resistances 176 and 177. The final charge of capacitor is determined by the time interval between two ignition trigger pulses. The next trigger pulse A', causes switch 210 to change state and the capacitor being charged is by means of electronic switch 230 electrically connected to the current drain circuit and the capacitor is discharged at a rate which is a function of the manifold pressure. When the potential on the capacitor is equal to the reference potential applied to comparator 350 the comparator generates an output signal on terminal 353 indicative of the delay required to produce the proper time advance. The drain circuit continues to discharge capacitance 304 and 306 until the occurrence of the next ignition trigger signal. The leading edge of the trigger signal energizes the calibrated discharge network and the capacitor 304 or 306 is discharged through transistor 238 to the predetermined level prior to the switching of flip flop 302 which responds to the trailing edge of the trigger pulse. The switches 310 and 330 are coordinated so that when one capacitance 304 or 306 is being charged the other capacitance is being discharged. The discharge of the capacitance 304 and 306 is shown on FIG. 7B. FIG. 7B shows that the rate of discharge is between the limits determined by the signal limiting circuitry of the β signal generator circuit. When switches 310 and 330 change state, the voltage applied to the comparator becomes high and the output pulse of the comparator is terminated.

Referring now to FIG. 5, the ignition time signal from the comparator is applied to the off time control circuit 410 of the ignition logic and control circuit 400. The off time circuit 410 receives the output signal from the comparator terminal 353. Terminal 353 is connected to ground through a voltage divider network consisting of resistance 411 and 412 and to the input of a one shot multivibrator 413 from the junction between the resistance 411 and 412. Current to multivibrator 413 from the Bα power supply is controlled by a transistor 414 controlling the off time of the one shot multivibrator. Transistor 414 has its emitter connected to Bα and the collector is connected to the multivibrator 413. The base of transistor 414 is connected to the collector of transistor 416 and to Bα through forward biased diode 415. The base of transistor 416 is connected to ground through voltage divider network comprising resistances 417 and 418 and to the center junction of a biasing network comprising resistances 419 and 420 connected between B+ and ground through forward biasing diode 421 and resistance 422. The emitter of transistor 416 is connected to ground through resistance 423. The signal from the tachometer comparator 430 is applied to the junction between resistances 417 and 418 and controlling the bias on the bases of transistors 416 and 414 controlling the current flow to the one shot multivibrator 413 which effectively controls the length of the output signal.

The tachometer comparator 430 network comprises a tachometer 431 receiving ignition reference signal from the collector of transistor 112 through capacitance 432. The tachometer 431 is a frequency to voltage converter circuit which may be one of any of the circuits known in the art capable of performing this function. The output of the tachometer 431 is connected to an operational amplifier 433 through resistances 434 and 435. The operational amplifier 433 in combination with capacitances 436 and 437 act as a second order filter of the signal produced by the tachometer 431. The output of the operational amplifier 433 is applied to the junction between resistances 417 and 418 in the off time control circuit 410 through resistance 438 and diode 439. The output signal of operational amplifier 433 is also applied to a comparator 440 through resistance 441. The comparator 440 receives a fixed reference signal from resistance divider network comprising resistances 442 and 443 connected between b+ and ground. The reference signal from the voltage divider network of resistances 442 and 443 is a signal indicative of a signal produced by the tachometer 431 when the engine speed is indicative of the engine's idle speed. The output of the comparator 440 is applied to the base of transistor 444 through resistance 445 and diode 446. A Zener diode 447 connected between the resistance 445 and the diode 446 limits the magnitude of the signal applied to the base of transistor 444. The collector of transistor 444 is connected to the five volt power supply and the emitter of transistor 444 is connected to the input to inverter 448 and to ground through resistance 449. Also connected to the input to amplifier 448 through diode 17 is a signal indicative of a start attempt from terminal 16.

The operation of the tachometer comparator circuit 430 is as follows. The tachometer 431 receives ignition reference signals at a frequency proportional to the speed of the engine. The tachometer 431 converts this frequency signal to a DC voltage proportional to the speed of the engine. This signal is filtered by operational amplifier 433 and the filtered signal is applied to the pulse off time circuit 410 where it controls the off time of the ignition signals. The output of operational amplifier 437 is also communicated to the input of comparator 440 where it is compared to the signal that the engine is operating at the idle. When the output signal from operational amplifier 433 is equal to or less than the reference signal from the junction between resistances 442 and 443, the comparator 440 generates a signal which causes transistor 444 to conduct. The conductance of transistor 444 places a positive signal at the input of inverter 448. The output of inverter 448 is a negative signal in response to the positive input signal from the transistor 444. The positive signal from the emitter of transistor 444 and the negative signal from the output of inverter 448 are communicated to the start idle and run logic circuit 450.

A start signal appearing at terminal 16 also applies a positive signal to the input of amplifier 448 having the same effect as a positive signal appearing on emitter of transistor 444. The start idle and run logic 450 comprises an AND Gate 451 having one input gate connected to the emitter of transistor 444 in the tachometer comparator circuit and one input gate connected to the collector of transistor 112 in the ignition trigger generator circuit 110. The start idle and run logic circuit 450 has a second AND Gate 452 having one input gate connected to the inverter 448 and the other input gate connected to the output of the one shot multivibrator 413 in the off time control 410. The outputs of AND Gate 451 and 452 are connected to OR Gate 453. The negative output of OR Gate 453 is connected to inverter 454 and the negative output of inverter 454 is connected to output terminal 455.

The operation of the start idle and run logic is as follows. When the engine is running at a speed greater than idle and there is no start signal applied to the tachometer comparator circuit 430, AND Gate 451 receives a negative signal at one of its input terminals from the emitter of transistor 444 and is effectively closed. The negative signal on the input to the inverter 448 produces a positive output signal applied to the input gate of AND Gate 452 and Gate 452 will conduct each time it receives an ignition time signal from the output of the multivibrator 413 in the off time control circuit 410. The ignition signal transmitted by the off time control is input into OR Gate 453. The OR gate 453 transmits the ignition signal to inverter 454 where it is transmitted to output terminal 455. As indicated previously with regards to the discussion to the comparator circuit 430, when the output signal from the tachometer 431 is indicative of a speed which is equal to or less than the idle speed of the engine, the comparator 440 generates a signal which causes transistor 444 to become conductive and generates a positive signal at the input to inverter 448 and AND Gate 451. Inverter 448 generates a negative output which closes AND Gate 452 and blocks the ignition signal from the off time control circuit. AND Gate 451 is now active and each time an ignition reference signal from the collector of transistor 112 occurs AND Gate 451 transmits the ignition reference signal to OR Gate 453 and inverter 454 and the ignition signal appearing at the output terminal 455 is the ignition reference signal appearing at the collector of transistor 112 rather than the ignition signal output from the off time control circuit 410. The output signal appearing on terminal 455 is applied to the high voltage generator circuit 18 which is communicated to the distributor 10 which applies the high voltage ignition signal to the appropriate spark plug or ignition means in the engine, as discussed with reference to FIG. 4. A start signal appearing on terminal 16 has the same effect as a positive signal appearing at the input of inverter 448 from the collector of transistor 442.

An ignition timing system embodying the circuitry disclosed on FIG. 5 and 6 was built and installed on a conventional automotive internal combustion engine. The actual delay period obtained with this timing system compared to the nominal value of the delay computed from the nominal advance data supplied by the manufacture is shown on Table 1. It is seen that the actual delay time closely approximate the nominal delay times for various engine speeds and various intake manifold pressures. On Table 1 the time interval in milliseconds between reference signals in shown in the column Time Interval and the nominal and actual delay time data at various manifold pressures is shown in the appropriate columns. The data in the columns is the delayed time in milliseconds from the ignition trigger signal. Although the preferred embodiment of the invention has been disclosed in minute circuit detail, it is not intended that the invention be limited to the detail illustrated and shown. It is well known that circuits different from those illustrated are capable of performing the same or comparable functions. The illustrated circuits of the preferred embodiment are merely to describe the invention and it is possible to change certain portions of the circuit without deviating from the spirit of the invention.

municate high voltage ignition signals to each of said ignition means in a predetermined sequence, sensor means generating load signals indicative of the engine's load and ignition reference signal generating means connected in a second predetermined timing relationship with said crankshaft to generate at predetermined rotational intervals of said crankshaft ignition reference signals for each of said combustion chambers; an ignition timing systemm for generating ignition time signals for triggering said means for generating high voltge ignition signals comprising:

means responsive to said ignition reference signals for generating $\beta_S$ signals inversely proportional to the ignition advance requirements of the engine as a function of speed, said $\beta_S$ signals switching from one predetermined value to another predetermined value in a predetermined sequence and at predetermined time intervals;

means responsive to said load signals for generating $\beta_P$ signals inversely proportional to the ignition advance requirements of the engine as a function of engine load; and means integrating said $\beta_S$ signal between the occurrence of two consecutive ignition reference signals, and dissipating said integrated $\beta_S$ signal as a function of said $\beta_P$ signal between the second of said two successive ignition reference signals, a third consecutive ignition reference signal for generating ignition time signals having a time advance from the occurrence of said third consecutive ignition reference signal which is a function of both engine speed and engine load, said ignition time signals triggering said means for generating high voltage ignition signals.

2. The combination of claim 1 wherein said means for generating $\beta_S$ signals generates a singal having a first value for a first predetermined time interval, a second value for a second predetermined time interval and a third predetermined value for a third predetermined time interval.

TABLE 1

| | | TIME DELAY FROM IGNITION TRIGGER (MILLISECONDS) | | | | | | | |
|---|---|---|---|---|---|---|---|---|---|
| ENGINE SPEED | TIME INTERVAL (MILLI- | 200 TORR | | 310 TORR | | 430 TORR | | 540 TORR | |
| (RPM) | SECONDS) | NOMINAL | MEASURED | NOMINAL | MEASURED | NOMINAL | MEASURED | NOMINAL | MEASURED |
| 5,000 | 3.0 | 1.62 | 1.95 | 1.82 | 2.10 | 2.06 | 2.27 | 2.26 | 2.50 |
| 3,750 | 4.0 | 2.32 | 2.65 | 2.59 | 2.80 | 2.90 | 3.05 | 3.18 | 3.35 |
| 3,000 | 5.0 | 3.02 | 3.30 | 3.35 | 3.52 | 3.74 | 3.85 | 4.12 | 4.20 |
| 2,500 | 6.0 | 3.69 | 3.90 | 4.09 | 4.25 | 4.58 | 4.60 | 4.88 | 5.05 |
| 2,140 | 7.0 | 4.37 | 4.65 | 4.84 | 4.95 | 5.40 | 5.40 | 5.89 | 5.90 |
| 2,000 | 7.5 | 4.72 | — | 5.20 | — | 5.80 | — | 6.32 | — |
| 1,875 | 8.0 | 5.18 | 5.40 | 5.68 | 5.75 | 6.33 | 6.30 | 6.88 | 6.90 |
| 1,670 | 9.0 | 6.11 | 6.30 | 6.70 | 6.75 | 7.40 | 7.35 | 8.05 | 8.10 |
| 1,500 | 10.0 | 7.06 | 7.30 | 7.70 | 7.70 | 8.50 | 8.50 | 9.20 | 9.30 |
| 1,250 | 12.0 | 8.98 | 9.00 | 9.73 | 9.70 | 10.70 | 10.50 | 11.55 | 11.60 |
| 1,070 | 14.0 | 10.92 | 10.90 | 11.80 | 11.50 | 12.90 | 12.70 | 13.90 | 14.00 |
| 1,000 | 15.0 | 11.88 | — | 12.80 | — | 14.00 | — | 15.00 | — |
| 940 | 16.0 | 12.63 | 12.50 | 13.69 | 13.30 | 14.95 | 14.60 | 16.00 | 16.00 |
| 830 | 18.0 | 14.20 | 14.05 | 15.40 | 15.00 | 16.80 | 16.30 | 18.00 | 18.00 |
| 750 | 20.0 | 15.80 | — | 17.10 | — | 18.70 | — | 20.00 | — |
| 680 | 22.0 | 17.40 | — | 18.85 | — | 20.50 | — | 22.00 | — |
| 624 | 24.0 | 19.00 | — | 20.50 | — | 22.40 | — | 24.00 | — |

What is claimed is:

1. In combination with an internal combustion engine having a crankshaft, a plurality of combustion chambers, each of said combustion chambers having an associated ignition means, means for generating a high voltage ignition signal in response to ignition time signals, distributor means connected in a first predetermined timing relationship with said crankshaft to com- 3. The combination of claim 2 wherein said means for generating $\beta_S$ signals comprises:

circuit means for generating a time reference signal indicative of time after the occurrence of each ignition reference signal;

first comparator means receiving said time reference signal for generating a first interval signal indicative of said first time interval;

second comparator means receiving said time reference signal for generating a second interval signal indicative of said second time interval;

third comparator means receiving said time reference signal for generating a third interval signal indicative of said third time interval; and a constant current source of generating a first current signal having said first value in a response to said first interval signal, a second current signal having said second value in response to said second interval signal and a third current signal having said third value in response to said third interval signal wherein said first, second and third current signals are said $\beta_S$ signal.

4. The combination of claim 3 wherein said sensor means generating load signals is a pressure sensor generating pressure signals indicative of the pressure in the engine's air intake manifold, said means for generating said $\beta_P$ signal comprises:

first limiter means receiving said pressure signals for limiting the maximum value of the pressure signal to a value indicative of a predetermined first pressure;

second limiter means receiving said pressure signal limited by said first limiter means for limiting the value of said pressure signal to a value indicative of a predetermined second pressure;

means receiving said pressure signal limited by said first limiter means and said second limiter means for generating a discharge current signal indicative of the value of said limited pressure signal, wherein said discharge current signal is said $\beta_P$ signal.

5. The combination of claim 4 wherein said means for generating said ignition time signals comprises:

first capacitor means;

second capacitor means;

switch means for alternatively charging and discharging said first and second capacitor means with said $\beta_S$ and $\beta_P$ signals in response to said ignition reference signals, said switch means having a first state communicating said $\beta_S$ signals to said first capacitor means and said $\beta_P$ signals to said second capacitor means, and a second state communicating said $\beta_S$ signals to said second capacitor means and said $\beta_P$ to said first capacitor means, said switch means operative to switch from one state to the other in response to said ignition reference signal;

second switch means synchronized with the state of said first switch means for transmitting a signal indicative of the potential on said first and second capacitor when said first and second capacitor means are receiving said $\beta_P$ signal;

comparator means receiving said signal transmitted by said second switch means indicative of the charge on said first and said second capacitors for generating ignition time signals each time said first and second capacitors are discharged to a predetermined value.

6. The combination of claim 1 wherein said ignition time signals have a pulse length equal in time to said time advance from the occurrence of said third consecutive ignition reference signal, said ignition timing system further includes means for regulating the pulse length of said ignition time signals in response to said ignition reference signals to control the off time between successive ignition timing signals.

7. The combination of claim 6 wherein said means for regulating the pulse length of said ignition time signals includes:

tachometer means for generating a signal indicative of the engine speed in response to said ignition reference signals; and means receiving said ignition time signals from said comparator means for regulating the pulse length of said ignition time signals as an inverse function of engine speed.

8. The combination of claim 7 wherein said means for generating a signal indicative of the engine speed further includes comparator means for generating a signal indicative that the engine is in the idle mode of operation and wherein said ignition timing system further includes logic control means receiving said ignition time signals from said means from regulating the pulse length of the ignition time signals and said signal indicative that the engine is in the idle mode of operation and said ignition reference signals for applying said ignition reference signals to said means for generating high voltage ignition signals when the engine is in the idle mode of operation and supplying said ignition time signals to said means for generating high voltage ignition signals when the engine is running at speeds greater than said idle speed.

9. The combination of claim 8 wherein said internal combustion engine further includes means for generating a start signal indicative of an attempt to start the engine, said logic means further includes means receiving said start signal for applying said ignition reference signals to said means for generating high voltage ignition signals when said start signals are being received.

10. An electronic ignition timing system for use in conbination with an internal combustion engine having a crankshaft, at least one combustion chamber having ignition means, means for generating high voltage ignition signals in response to ignition time signals, means connected in a first predetermined timing relationship with the crankshaft to communicate the high voltage ignition signals to the ignition means of the at least one combustion chamber, a pressure sensor generating pressure signals indicative of the pressure in the engine's air intake manifold comprising:

means connected in a second predetermined timing relationship with the engine's crankshaft for generating at at least one rotational position of the engine's crankshaft ignition reference signals;

means responsive to said ignition reference signals for generating a charge current signal, said charge current signal having at least a first value predetermined for a first predetermined time interval and a second predetermined value for said second time interval;

means responsive to the pressure signals for generating discharge current signals, said discharge current signals having a maximum vaue indicative of a first predetermined pressure and a minimum value indicative of a second predetermined pressure and pressure dependent value between said maximum and minimum values for pressure signals indicative of pressure between said first and second predetermined pressure; and means for generating said ignition time signals in response to said charge current signals, said discharge current signals and said ignition reference signals, said means integrating said charge current signals in a time interval between two successive ignition reference signals to generate an integrated charge current signal, and after the occurrence of the second of said two successive ignition reference signals dissipating said integrated charge current signal with said discharge current signals, said means generating said ignition time signal when the value of the integrated charge current signals are dissipated to a predetermined value.

11. The combination of claim 10 wherein said means for generating charge current signal generates a signal having three different values, said charge current signal having a first value for a first predetermined time interval, a second predetermined value for a second predetermined time interval and a third predetermined value for a third predetermined time interval.

12. The ignition timing system of claim 11 wherein said internal combustion engine has a plurality of combustion chambers and each of the combustion chambers has an associated ignition means, and wherein the means for communicating the high voltage ignition signals to the ignition means communicates said high voltage ignition signals to the ignition means of each cylinder in a predetermined sequence, said means for generating ignition reference signals, generates at predetermined angular positions of said crankshaft, ignition reference signals for each combustion chamber.

13. The combination of claim 12 wherein said means for generating charge current signal comprises:
circuit means for generating a time reference signal indicative of the time after the occurrence of an ignition reference signal;
comparator means receiving said time reference signal for generating a first interval signal indicative of the first time interval, a second interval signal indicative of said second time interval and a third interval signal indicative of said third time interval; and
charge current source means for generating a first current signal having said first value in a response to said first interval signal, a second signal having said second value in response to said second interval signal and a third current signal having said third value in response to said third interval signal wherein said first, second and third current signals are said charge current signals.

14. The combination of claim 13 wherein said means for generating said discharge current signal comprises:
first limiter means receiving said pressure signals for generating a once limited pressure signal having a maximum value indicative of said first pressure;
second limiter means receiving said once limited pressure signal for generating a twice limited pressure signal having a maximum value indicative of said first pressure and a minimum value indicative of said second pressure;
means receiving said twice limited pressure signal for generating said discharge current signal having a maximum and minimum value determined by the maximum and minimum value of said twice limited pressure signal.

15. The combination of claim 14 wherein said means for generating said ignition time signals comprises:
first capacitor means;
second capacitor means;
first switch means for alternatively charging and discharging with said charge current and discharging current signals respectively, said first and second capacitor means in response to said ignition reference signals, said switch means having a first state communicating said charge current signal to said first capacitor means and said discharge current signal to said second capacitor means, and a second state communicating said charge current signal to said second capacitor means and said discharge current signal to said first capacitor means, said switch means operative to switch from one state to the other in response to said ignition reference signal;
second switch means synchronized with the state of said first switch means for transmitting a signal indicative of the value of the charge on said first and said second capacitor when said first and second capacitor means is being dissipated by said discharge current signal;
comparator means receiving said signal transmitted by said second switch means indicative of the value of the charge on said first and said second capacitors for generating an ignition time signal when the charge on said first and second capacitors is dissipated to a predetermined value.

16. The combination of claim 12 wherein said ignition time signals have a pulse length equal to the time level between the time said integrated charge current signals are dissipated to said predetermined value and the next sequential ignition reference signal; said ignition timing system further includes means for regulating the pulse length of said ignition time signals in response to said ignition reference signals to control the off time between successive ignition timing signals.

17. The combination of claim 16 wherein said means for regulating the pulse length of said ignition time signals includes:
means for generating a signal indicative of the engine speed in response to said ignition time signals;
means responsive to said signal indicative of the engine speed for generating a pulse length control signal having a value indicative of the engine's speed;
one shot multivibrator means triggered by said ignition time signal from said comparator means for generating ignition time pulse signals having a pulse length determined by the value of said pulse length control signal.

18. The combination of claim 17 wherein said means for generating a signal indicative of the engine speed further includes comparator means for generating a signal indicative that the engine is in the idle mode of operation and wherein said ignition timing system further includes logic control means receiving said ignition time pulse signal, said signal indicative that the engine is in the idle mode of operation and said ignition reference signals for applying said ignition reference signals to said means for generating a high voltage ignition signal when the engine is in said idle mode of operation and applying said ignition time pulse signals to said means for generating high voltage ignition signals when the engine is running at speeds greater than said idle speed.

19. The combination of claim 18 wherein said internal combustion engine further includes means for generating a start signal indicative of an attempt to start the engine, said logic means further includes means receiving said start signal for applying said ignition reference signals to said means for generating high voltage signals when said start signals are being received.

20. A method for electrically generating ignition time signals for an internal combustion engine having an advance which is a function of engine speed and engine load, where the internal combustion engine has a crankshaft, at least one combustion chamber having an associated means for ignition, means for generating high voltage ignition signals in response to ignition time signal, distributor means connected in a first predetermined timing relationship with said crankshaft to communicate the high voltage ignition signals to the ignition means, and means for generating load signals indicative of the engine's load; comprising the steps of:
   detecting at least one predetermined rotational interval of said crankshaft to generate an ignition reference signal for said at least one combustion chamber for each operational cycle of the engine;
   initiating, in response to said ignition reference signals, the generation of a first current signal for a first predetermined time interval, a second current signal for a second predetermined time interval following said first time interval and a third current signal for the time interval following said second predetermined time period to produce a speed reference signal;
   amplifying and limiting said load signal to generate a load reference signal, said load reference signal having maximum value indicative of a first load having a first predetermined value and having a minimum value indicative of a second load having a second predetermined value and load dependent values between said maximum value and said minimum value when the load is between said first and said second value;
   combining said speed reference signal and said load reference signal in a timed sequence controlled by two successive ignition reference signals to generate ignition time signals occurring in advance of a third successive ignition reference signal, said advance being a function of both engine speed and engine load.

21. The method of claim 20 wherein said internal combustion engine has a plurality of combustion chambers and each of the combustion chambers has an associated ignition means and said distributor means communicates ignition signals to each ignition means in a predetermined sequence, said step of detecting comprises detecting a like plurality of rotational intervals of said crankshaft to generate an ignition reference signal for each of said plurality of ignition means for each operational cycle of the engine.

22. The method of claim 21 wherein the pressure in the engine's intake manifold is indicative of the engine's load and wherein said means for generating a load signal is a pressure sensor generating pressure signal indicative of the pressure in the engine's air intake manifold, said step of amplifying and limiting comprises amplifying and limiting said pressure signals to generate a load reference signal having a maximum value indicative of a first predetermined pressure and a minimum value indicative of a second predetermined pressure and pressure dependent values when the pressure in the engine's intake manifold between said first and said second predetermined value.

23. The method of claim 22 wherein said step of initiating the generation of said first, second and third current signals comprises the steps of:

generating a time reference signal in response to said ignition reference signals indicative of the time after the occurrence of each ignition reference signals;
sequentially generating first, second and third intervals signals in response to said time reference signals; and
generating said first current signal in response to said first interval signal, said second current signal in response to said second interval signal, and said third current signal in response to said third interval signal wherein said first, second and third current signals comprises said speed reference signal.

24. The method of claim 23 wherein said step of generating said first, second and third interval signals comprises the steps of:
   generating a first and second interval reference signal indicative of the value of said time reference signal at the ends of said first and said second time intervals respectively;
   generating said first interval signal when said time reference signal is indicative of a time less than said first interval reference signal and said second interval signal;
   generating said second interval signal when said time reference signal is indicative of a time greater than said first interval reference signal and less than said second interval reference signal; and
   generating said third interval signal when said time reference signal is indicative of a time greater than said second time.

25. The method of claim 23 wherein said step of amplifying and limiting said load signal includes the steps of:
   generating a first reference potential having a value indicative of said first predetermined pressure;
   electronically limiting the maximum value of said pressure signal to a value equal to the value of said first reference potential;
   generating a second reference potential having a value indicative of said second predetermined pressure;
   electronically limiting the minimum value of said pressure signal to a value equal to the value of said second reference potential; and
   controlling the current flow of a current sink as a function of the value of the amplified and limiting pressure signal wherein the current flow of said current sink is said load signal.

26. The method of claim 25 wherein said ignition reference signals generate a series of sequential time intervals wherein each time interval is the time between two successive ignition reference signals and further, wherein said series of sequential time intervals are divided into two alternating groups of time intervals and wherein successive time intervals of one of said two groups are separated from each other by a time interval of the other of said two groups, said step of combining said speed reference signal with said load reference signal comprises:
   sequentially charging a first comparator during each time interval of said one group and sequentially charging a second capacitor during each time interval of said other group with said first, second and third current signals;
   discharging said first capacitor during each time interval of said other group and discharging said second capacitor during each time interval of said one group;

generating a charge reference signal indicative of a predetermined charge on said first and said second capacitor;

comparing the charge on said first capacitor during each time interval of said other group and comparing the charge on said second capacitor during each time interval of said other group to said charge reference signal; and generating said ignition time signals each time the charge on said first and said second capacitor is equal to said charge reference signal.

27. The method of claim 26 wherein the frequency of said ignition reference signals is a function of the engine's speed, said method further includes the step of regulating the pulse length of said ignition time signals as a function of engine speed in response to said ignition reference signals.

28. The method of claim 27 wherein said step of regulating the pulse length comprises the steps of:

generating a signal indicative of the engine's speed in response to said ignition reference signals; and triggering a one shot multivibrator with said ignition time signal and controlling the relaxation time of said one shot multivibrator with said signal indicative of the engine's speed.

29. The method of claim 28 wherein said step of generating a signal indicative of the engine's speed further includes the steps of:

generating an idle speed reference signal indicative of the engine's idle speed; and comparing said signal indicative of the engine's speed with said idle speed reference signal to generate an idle signal indicative that the engine is in the idle mode of operation;

said method for generating ignition time signals further includes the step of gating said ignition signals to said means for generating high voltage ignition signals in the absence of an idle signal; and gating said ignition reference signals to said means for generating high voltage ignition signals in response to an idle signal.

30. The method of claim 29 wherein said internal combustion engine further includes means for generating a start signal during an attempt to start the engine, said method for generating ignition signals further includes steps of gating said ignition reference signals to said means for generating high voltage ignition signals in response to said start signal.

* * * * *

UNITED STATES PATENT AND TRADEMARK OFFICE
CERTIFICATE OF CORRECTION

PATENT NO. : 4,033,272
DATED : July 5, 1977
INVENTOR(S) : Robert Samuel Henrich

It is certified that error appears in the above-identified patent and that said Letters Patent are hereby corrected as shown below:

Column 6, line 46, change "208" to --308--.

Column 9, lines 37-40, change as follows: The base of transistor 127 is connected to the junction of resistance divider circuit consisting [to the base of transistor 132] of resistances 130 and 131. The collector of transistor 127 is connected to the base transistor 132.

Column 13, line 43, change "304 and 306" to --304 or 306--.

Column 15, line 1, change "304 and 306" to --304 or 306--.

Column 15, line 17, change "$B_a$" to --B+--.

Column 15, line 19, change "$B_a$" to --B+--.

Column 15, line 22, change "$B_a$" to --B+--.

Column 15, line 56, change "b+" to --B+--.

Column 17, line 26, change "in shown" to --is shown--.

Column 18, line 9, change "systemm" to --system--.

Column 18, line 11, change "voltge" to --voltage--.

Column 18, line 36, change "singal" to --signal--.

UNITED STATES PATENT AND TRADEMARK OFFICE
CERTIFICATE OF CORRECTION

PATENT NO. : 4,033,272

DATED : July 5, 1977

INVENTOR(S) : Robert Samuel Henrich

It is certified that error appears in the above-identified patent and that said Letters Patent are hereby corrected as shown below:

Column 20, line 59, change "vaue" to --value--.

Column 21, line 42, change "a second signal" to --a second current signal--.

Column 21, line 68, change "discharging" to --discharge--.

Column 22, line 27, change "level between" to --interval between--.

Column 22, line 38, change "ignition time signals" to --ignition reference signals--.

Column 23, line 6, "where" to --wherein--.

Column 24, line 62, change "first comparator" to --first

Signed and Sealed this

Twenty-sixth Day of September 1978

[SEAL]

Attest:

RUTH C. MASON
*Attesting Officer*

DONALD W. BANNER
*Commissioner of Patents and Trademarks*